May 4, 1954     A. A. ANDERSON     2,677,299
SPEED NUT HAVING RELATIVELY MOVABLE HALVES
Filed Jan. 22, 1951
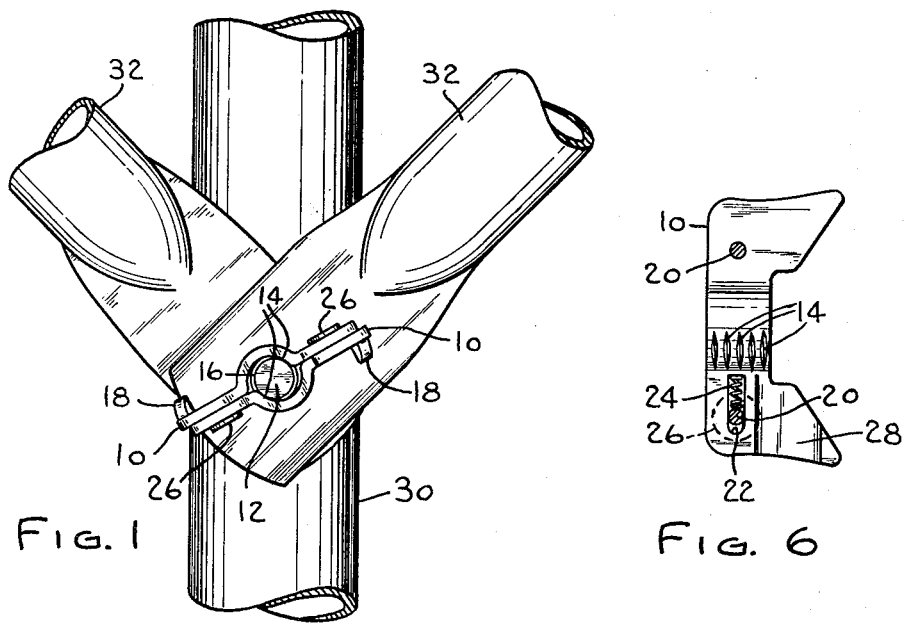
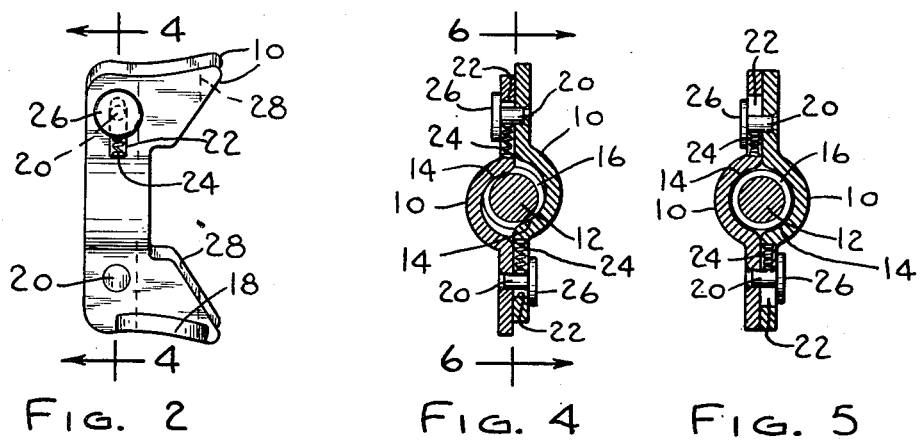
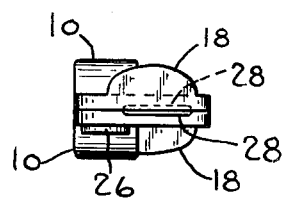
*INVENTOR.*
ARVID A. ANDERSON
BY
*ATTORNEY*

Patented May 4, 1954

2,677,299

UNITED STATES PATENT OFFICE 2,677,299

SPEED NUT HAVING RELATIVELY MOVABLE HALVES

Arvid A. Anderson, Milwaukee, Wis., assignor to Safway Steel Products, Inc., Milwaukee, Wis., a corporation of Wisconsin Application January 22, 1951, Serial No. 207,210

6 Claims. (Cl. 85—33)

This invention relates to speed nuts and particularly to a speed nut which may be moved axially over a bolt or threadably engaged with the bolt for normal usage.

An object of this invention is to provide a simple, rugged speed nut which securely engages a bolt and may be fabricated at low cost.

Another object is to provide a speed nut which may move axially over a bolt or may be manipulated as a wing nut.

Another object is to provide a speed nut which engages the threads of a bolt with greater force than conventional wing nuts and resists the tendency to "walk off" a bolt when vibrated.

A further object is to provide a speed nut basically comprised of two similar stampings which may be manufactured at low cost.

Still another object is to provide a speed nut having few parts and which may be manufactured and assembled for substantially the same cost as a conventional nut.

Other objects and advantages will be pointed out in, or be apparent from, the specification and claims, as will obvious modifications of the single embodiment shown in the drawings, in which:

Fig. 1 is an elevation showing the nut in use in conventional scaffolding;

Fig. 2 is a side elevation of the nut;

Fig. 3 is an end elevation;

Fig. 4 is a cross-section on line 4—4 of Fig. 2 showing the nut engaging the threads of a bolt;

Fig. 5 is similar to Fig. 4 but shows the nut in position for axial movement along the bolt; and Fig. 6 is a cross-section taken on line 6—6 of Fig. 4.

Essentially this nut is a vertically split wing nut wherein two identical members 10, 10 are relatively movable between a thread-engaging position and a position permitting the nut to be moved over a bolt 12 without engaging the threads. In the latter position (Fig. 5) the central aperture is generally circular and of a greater diameter than the bolt. When engaging the bolt the two semi-cylindrical portions are diametrically shifted (Fig. 4) to decrease the distance between opposing thread portions and cause the nut threads 14 to engage the bolt threads 16. Each half of the nut is formed by stamping and is provided with a finger pad 18 at one end. When assembled, the two halves face each other so that one pad is at each end of the complete nut. The members are interconnected at each end for relative movement by means of a pin 20 fixed in one arm and projecting through a slot 22 in the other arm. A spring 24 is compressed between the inner end of the slot and the pin and is retained in position by the large head 26 on the pin. The head 26 on the pin is formed to avoid excessive pressure holding the members together and thus hindering movement. Friction between the members is kept low by providing a groove 28 in each half to confine the wear to two parallel faces.

With this construction in mind it will be apparent that springs 24, compressed between the pin, fixed in one member, and the end of the slot in the other member, biases the members to an offset position where the centers of the semi-cylindrical faces are out of registry. Pressure on the pads 18, 18 will overcome the springs and bring the centers into registry to form a circular aperture. In this position the inside nut diameter exceeds the bolt diameter and the nut may be moved along the bolt without rotational movement. When the pads are released the springs force the threads 14 on each member into engagement with the bolt threads. Since the nut threads occupy an appreciable vertical distance and are spring biased into engagement, the nut grips the bolt firmly. After the nut has been moved axially along the bolt and released to engage the threads, it may be turned as a conventional wing nut to tighten the nut.

It will be noted that approximately half of each face is threaded while the other half is smooth. The smooth portion would serve no useful function if threaded but would tend to make axial movement of the nut more difficult by snagging on the bolt threads. When smooth, as shown, the nut is conveniently moved by holding the smooth portion against the threads to insure ample clearance at threads 14. The 50% engagement of the threads is fully satisfactory and the threads 14 are positioned to tend to increase the "bite" as the nut is turned down.

This nut is useful in many fields, where appreciable time may be saved by eliminating the tedious process of turning down nuts. In erecting and taking down scaffolding this nut is particularly useful and time-saving since many nuts are employed as shown in Fig. 1 to secure cross braces 32 to major strength members. In such cases the bolt 12 is carried on the tube 30 and projects through holes in the flattened ends of braces 32. The speed with which this nut may be placed on or removed from a bolt introduces a considerable safety factor by reducing the hazardous time spent in erection of the various structural elements. Maintenance of the scaffold is simplified since the instant nuts, being spring biased into engagement with the bolt, do not "walk off" the bolt when the scaffolding is vibrated. Conventional wing nuts tend to walk off and must be tightened periodically. In connection with the spring bias it should be noted that provision is made for travel past the thread-engaging position to insure spring pressure at all times (see Fig. 4).

While this nut appears complicated when compared to conventional nuts it may be fabricated for substantially the same cost since the major parts are stampings with the threads being stamped rather than cut. The assembly of the spring is simply a matter of placing the spring in the slot and heading the pin to retain the spring and hold the halves together.

Constructions and forms other than the illustrated embodiment are considered to be within the scope of this invention. Therefore, the breadth of the invention is to be limited only by the scope of the claims.

I claim:

1. A speed nut comprising, a pair of members each of which is provided with a semi-annular portion having substantially diametrical arms projecting therefrom and lying substantially in the same plane as includes the major chords of said semi-annular portions, said members facing each other to generally provide an annulus adapted to receive a bolt of lesser diameter than the minor diameter of the annulus, a slot in one arm of each member, a pin fixed in the other arm of each member and projecting through the slot in said one arm of the opposite member, a spring compressed between the end of each slot and its corresponding pin to bias the members in a direction diametrically offsetting the members in said plane, threads formed on each semi-annular portion to engage the bolt threads when the members are diametrically offset, and a head on each of said pins to hold the members together and to retain the springs in their respective slots.

2. A speed nut comprising, a pair of members each of which is provided with a generally semi-cylindrical face having substantially diametrical arms projecting therefrom and lying in substantially the same plane as includes the major chord of said faces, said members facing each other to generally define a cylindrical opening therebetween adapted to receive a bolt of lesser diameter, a slot in one arm of each member, a pin fixed in the other arm of each member and projecting through the slot in said one arm of the opposite member, a spring compressed between the end of each slot and its corresponding pin to bias the members in a direction diametrically offsetting the members in said plane, threads on each face for engaging the bolt threads when the members are diametrically offset, and a head on each pin to hold the members together and to retain the springs in their respective slots.

3. A speed nut comprising, a wing nut, said nut being vertically split in a plane through its wings and including the axis of the central bore of the nut, means interconnecting the halves of the nut permitting relative movement of the halves along said plane, means limiting movement of the halves between one position where the semi-circular apertures are substantially concentric and another position where the apertures are offset in said plane.

4. A vertically split wing nut having its two halves interconnected for relative movement along the plane of the split between a maximum effective diameter position wherein the axes of the halves are substantially coincident and a minimum effective diameter position wherein the axes are not coincident, and means biasing the halves to the latter position, said plane including said axes in both of said positions.

5. A speed nut comprising, a pair of semi-annular members, means interconnecting said members for relative movement along a plane including the major chord of both members, between a maximum effective diameter position wherein the centers of said members are generally coincident and a minimum effective diameter position wherein the centers are in said plane but out of registry, means biasing said members to the minimum diameter position, and threads on the interior faces of said members to engage bolt threads when the members are in said minimum diameter position.

6. A speed nut comprising, a pair of members having substantially semi-cylindrical faces oppositely related to define a generally cylindrical opening therebetween, means interconnecting said members for relative movement along a plane including the major chord of both faces, said members being movable between a maximum effective diameter position wherein the axes of said faces are substantially coincident and a minimum effective diameter position wherein the axes are offset in said plane, threads on said faces to engage bolt threads when said members are in the latter position, and means biasing said members to the minimum effective diameter position.

References Cited in the file of this patent

UNITED STATES PATENTS

| Number | Name | Date |
|---|---|---|
| 1,733,415 | Lawley | Oct. 29, 1929 |
| 2,118,361 | Schaeffer | May 24, 1938 |
| 2,334,801 | Zimmerman | Nov. 23, 1943 |
| 2,403,566 | Thorp et al. | July 9, 1946 |